United States Patent
Nair et al.

(10) Patent No.: US 12,014,186 B2
(45) Date of Patent: Jun. 18, 2024

(54) REDUCING DOWNTIME DURING OPERATING SYSTEM PATCHING

(71) Applicant: SAP SE, Walldorf (DE)

(72) Inventors: Siju Thondiyil Vasudevan Nair, Thrjissur (IN); Subeesh Nikarthil Sivadasan, Alappuzha (IN); Tobias Zeuch, Karlsruhe (DE); Ritesh Mangalore Shenoy, Bangalore (IN); Gautham Jayatheertha, Bangalore (IN)

(73) Assignee: SAP SE, Walldorf (DE)

( * ) Notice: Subject to any disclaimer, the term of this patent is extended or adjusted under 35 U.S.C. 154(b) by 97 days.

(21) Appl. No.: 17/704,291

(22) Filed: Mar. 25, 2022

(65) Prior Publication Data

US 2023/0305854 A1    Sep. 28, 2023

(51) Int. Cl.
*H04L 15/16*    (2006.01)
*G06F 8/65*    (2018.01)
(Continued)

(52) U.S. Cl.
CPC ............ *G06F 9/4408* (2013.01); *G06F 8/65* (2013.01); *G06F 9/45558* (2013.01);
(Continued)

(58) Field of Classification Search
CPC ...... G06F 9/4408; G06F 8/65; G06F 9/45558; G06F 11/1451; G06F 2009/45562; G06F 2009/45575
(Continued)

(56) References Cited

U.S. PATENT DOCUMENTS 2,953,032 A * 9/1960 Ruess ..................... F16H 55/56
  474/93
3,084,595 A * 4/1963 Watts ..................... G02C 11/02
  351/111
(Continued)

FOREIGN PATENT DOCUMENTS

WO   WO-2011031309 A1 *   3/2011   ............. C08F 10/00
WO   WO-2011100642 A2 *   8/2011   ............. A61K 31/47
(Continued)

*Primary Examiner* — Emmanuel L Moise
*Assistant Examiner* — Berhanu Shitayewoldetadik
(74) *Attorney, Agent, or Firm* — SCHWEGMAN LUNDBERG & WOESSNER, P.A.

(57) ABSTRACT

In an example embodiment, a solution is provided that reduces downtime during operating system patching. This reduces the downtime, regardless of which activity is being performed, and is platform-agnostic. More specifically, a target image for the operating system is obtained. During a preparation phase, a virtual machine with the target image is deployed. This virtual machine is deemed a reference virtual machine. A backup of the reference virtual machine bootable root disk is then taken, and a reference root block device is updated with a customer virtual machine operating system/application/database configuration files and folders. These customer-specific configuration files are then copied from block devices of the customer virtual machine to the reference virtual machine. The reference virtual machine can then be powered on. Only then is the customer virtual machine shut down, and the reference virtual machine swapped in for the customer virtual machine, minimizing the downtime during this period.

20 Claims, 6 Drawing Sheets

(51) Int. Cl.
*G06F 9/4401* (2018.01)
*G06F 9/455* (2018.01)
*G06F 9/46* (2006.01)
*G06F 11/14* (2006.01)
*G06F 15/16* (2006.01)

(52) U.S. Cl.
CPC ............... *G06F 11/1451* (2013.01); *G06F 2009/45562* (2013.01); *G06F 2009/45575* (2013.01)

(58) Field of Classification Search
USPC .......................................................... 709/222
See application file for complete search history.

(56) References Cited

U.S. PATENT DOCUMENTS

| | | | | |
|---|---|---|---|---|
| 4,253,145 | A * | 2/1981 | Goldberg | G06F 9/45558 703/21 |
| 5,681,465 | A * | 10/1997 | Takenoya | B01D 29/03 210/407 |
| 6,421,470 | B1 * | 7/2002 | Nozaki | G03B 31/06 715/202 |
| 6,795,966 | B1 * | 9/2004 | Lim | G06F 11/1438 718/1 |
| 8,166,477 | B1 * | 4/2012 | Tormasov | G06F 9/45558 718/1 |
| 9,176,744 | B2 * | 11/2015 | Lee | G06F 8/658 |
| 9,189,342 | B1 * | 11/2015 | von Thenen | G06F 9/455 |
| 9,292,327 | B1 * | 3/2016 | von Thenen | G06F 11/1484 |
| 10,481,983 | B1 * | 11/2019 | Miah | G06F 16/128 |
| 2007/0260831 | A1 * | 11/2007 | Michael | G06F 9/5066 711/162 |
| 2008/0126792 | A1 * | 5/2008 | Herington | G06F 9/45537 713/100 |
| 2008/0155169 | A1 * | 6/2008 | Hiltgen | G06F 9/5077 711/6 |
| 2008/0155208 | A1 * | 6/2008 | Hiltgen | G06F 9/45533 711/E12.001 |
| 2008/0155223 | A1 * | 6/2008 | Hiltgen | G06F 21/6218 718/1 |
| 2009/0007105 | A1 * | 1/2009 | Fries | G06F 8/65 718/1 |
| 2009/0027001 | A1 * | 1/2009 | Haines | H02J 7/35 320/101 |
| 2009/0260007 | A1 * | 10/2009 | Beaty | G06F 9/5077 718/1 |
| 2009/0282101 | A1 * | 11/2009 | Lim | G06F 9/45558 718/1 |
| 2010/0042796 | A1 * | 2/2010 | Vasilevsky | G06F 9/45533 718/1 |
| 2010/0306173 | A1 * | 12/2010 | Frank | G06F 9/45558 718/1 |
| 2010/0306770 | A1 * | 12/2010 | Frank | G06F 9/45558 718/1 |
| 2010/0325471 | A1 * | 12/2010 | Mishra | G06F 11/1484 718/1 |
| 2011/0040812 | A1 * | 2/2011 | Phillips | G06F 9/45541 707/822 |
| 2011/0055299 | A1 * | 3/2011 | Phillips | G06F 9/45533 707/827 |
| 2011/0061046 | A1 * | 3/2011 | Phillips | G06F 9/45533 717/176 |
| 2011/0107331 | A1 * | 5/2011 | Evans | H04W 4/60 718/1 |
| 2011/0126203 | A1 * | 5/2011 | Fahrig | G06F 9/45558 710/48 |
| 2011/0238969 | A1 * | 9/2011 | Warkentin | G06F 9/441 713/1 |
| 2012/0084768 | A1 * | 4/2012 | Ashok | G06F 9/45558 718/1 |
| 2012/0089972 | A1 * | 4/2012 | Scheidel | G06F 9/45558 718/1 |
| 2012/0144391 | A1 * | 6/2012 | Ueda | G06F 9/45558 718/1 |
| 2012/0265959 | A1 * | 10/2012 | Le | G06F 9/45558 711/E12.103 |
| 2012/0297181 | A1 * | 11/2012 | Lee | G06F 8/658 713/2 |
| 2013/0007733 | A1 * | 1/2013 | Fries | G06F 9/45533 718/1 |
| 2013/0151831 | A1 * | 6/2013 | Bealkowski | G06F 9/45533 713/2 |
| 2013/0322335 | A1 * | 12/2013 | Smith | H04W 8/26 370/328 |
| 2014/0157264 | A1 * | 6/2014 | Russinovich | G06F 8/65 718/1 |
| 2014/0289720 | A1 * | 9/2014 | Fries | G06F 8/65 717/170 |
| 2014/0298317 | A1 * | 10/2014 | Devine | G06F 8/61 717/174 |
| 2014/0310708 | A1 * | 10/2014 | Lim | G06F 9/45558 718/1 |
| 2015/0012570 | A1 * | 1/2015 | Le | G06F 16/116 707/823 |
| 2015/0178097 | A1 * | 6/2015 | Russinovich | G06F 8/656 713/2 |
| 2015/0339150 | A1 * | 11/2015 | Yanagisawa | G06F 9/45558 718/1 |
| 2016/0210259 | A1 * | 7/2016 | Tsirkin | G06F 13/4045 |
| 2016/0224572 | A1 * | 8/2016 | Le | G06F 16/188 |
| 2016/0342488 | A1 * | 11/2016 | Lim | G06F 9/5077 |
| 2017/0090963 | A1 * | 3/2017 | Nakajima | G06F 9/45558 |
| 2017/0183940 | A1 * | 6/2017 | Bailey | E21B 44/00 |
| 2017/0235563 | A1 * | 8/2017 | Bafna | G06F 11/2069 718/1 |
| 2017/0235679 | A1 * | 8/2017 | Tsirkin | G06F 9/45558 710/301 |
| 2018/0095162 | A1 * | 4/2018 | Fetterman | G01S 7/023 |
| 2018/0183580 | A1 * | 6/2018 | Scarlata | G06F 21/53 |
| 2018/0329734 | A1 * | 11/2018 | Bivens | G06F 9/45558 |
| 2020/0233674 | A1 * | 7/2020 | Natanzon | G06F 9/4401 |
| 2021/0334123 | A1 * | 10/2021 | Lent | G06F 9/4411 |
| 2021/0349614 | A1 * | 11/2021 | Daily | G06F 3/04847 |
| 2022/0014520 | A1 * | 1/2022 | Bhargav-Spantzel | H04W 12/088 |
| 2022/0276858 | A1 * | 9/2022 | Stumpf | G06F 12/0815 |
| 2023/0153140 | A1 * | 5/2023 | Pfefferle | G06F 9/45558 718/1 |

FOREIGN PATENT DOCUMENTS

| | | | | |
|---|---|---|---|---|
| WO | WO-2012118827 | A2 * | 9/2012 | ............ G06F 1/1626 |
| WO | WO-2013002409 | A1 * | 1/2013 | ............ G02B 1/041 |
| WO | WO-2014079194 | A1 * | 5/2014 | ......... G06F 9/45558 |
| WO | WO-2014118961 | A1 * | 8/2014 | ............ G06F 9/4401 |

* cited by examiner

REDUCING DOWNTIME DURING OPERATING SYSTEM PATCHING

TECHNICAL FIELD

This document generally relates to systems and methods for managing software upgrades. More specifically, this document relates to reducing downtime during operating system patching.

BACKGROUND

In large cloud environments, patching of operating system software (which can include distributing upgrades, major version upgrades, and security fixes, for example), can be a time-consuming process, during which the applications running on the device whose operating system software is being patched experiences a downtime.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a solution is provided that reduces downtime during operating system patching. It reduces the downtime, regardless of which activity (e.g., updates, distribution upgrade, major version upgrade, security fix, etc.) is performed, and is platform-agnostic. More specifically, a target image for the operating system is obtained. During a preparation phase, a virtual machine with the target image is deployed. This virtual machine is deemed a reference virtual machine. A backup of the reference virtual machine bootable root disk is then taken, and a reference root block device is updated with a customer virtual machine operating system/application/database configuration files and folders. These customer-specific configuration files are then copied from block devices of the customer virtual machine to the reference virtual machine. The reference virtual machine can then be powered off and brought to initial state by using the initial backup of reference virtual machine bootable root disk. Only then is the customer virtual machine shut down and the reference virtual machine updated bootable root disk gets swapped in for the customer virtual machine, minimizing the downtime during this period.

It should be noted that in the field of computer software, the distinctions between operations like patching, upgrading, adding security fixes, etc may be somewhat muddled. Some refer to a patch as an upgrade that is performed to fix a particular problem while an upgrade is to add new functionality, but this understanding is not universal. To avoid confusion, the present document will use the term "patch" broadly to refer to any modification to the operating system, including, but not limited to, operations that some may consider to be upgrades, security fixes, or the like.

Figure 1:
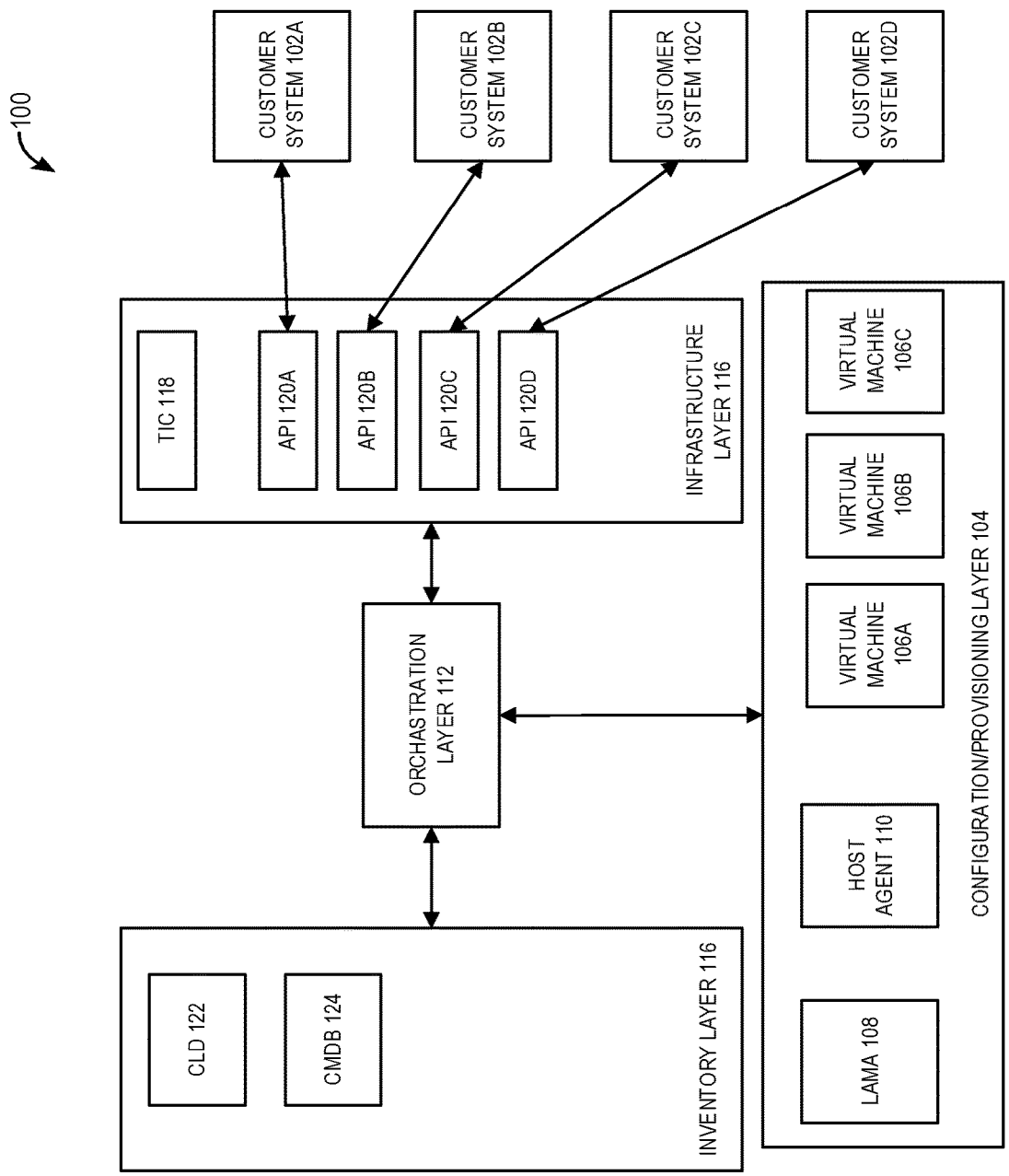
FIG. 1 is a block diagram illustrating an exemplary architecture for reducing downtime during operating system patching, in accordance with an example embodiment.

FIG. 1 is a block diagram illustrating an exemplary architecture 100, in accordance with an example embodiment. Architecture 100 may have a distributed architecture. Customer systems 102A-102D may operate servers/devices running operating systems. At some point, it may be desirable to patch the version of the operating system running on one of the customer systems 102A-102D from a first version of the operating system to a second version of the operating system. A configuration/provisioning layer 104 may initiate this patch using one or more virtual machines 106A-106C. More particularly, a landscape management automation studio (LAMA) 108 may provide a functionality that allows customers to customize, modify, and replace workflows within the architecture 100. One such workflow is an operating system patching workflow, which may be run by a host agent 110.

An orchestration layer 112 coordinates communication between the configuration/provisioning layer 104, an inventory layer 114, and an infrastructure layer 116. Infrastructure layer 116 includes a technical infrastructure controller (TIC) 118 that manages the infrastructure layer 116 as well as a plurality of application program interfaces 120A-120D, each of which allows communication to and from corresponding customer systems 102A-102D. Each API 120A-120D may facilitate communication to a different type of operating system. Thus, while FIG. 1 depicts each customer system 102A-102D having its own corresponding API 120A-120D, embodiments are foreseen where multiple customer systems having the same operating system type would share an API.

Inventory layer 114 contains a cloud landscape directory (CLD) 122, which is a tool that is used for fetching details about customer systems 102A-102D from a configuration management database (CMDB) 124.

In an example embodiment, a process for performing a patch of an operating system version contains three phases: (1) a preparation phase; (2) a downtime phase; and (3) a cleanup phase. Most of the work is performed in the preparation phase, which is an online phase, meaning that the servers/devices running the operating system are still running while this phase is being performed (no downtime yet).

Figure 2:
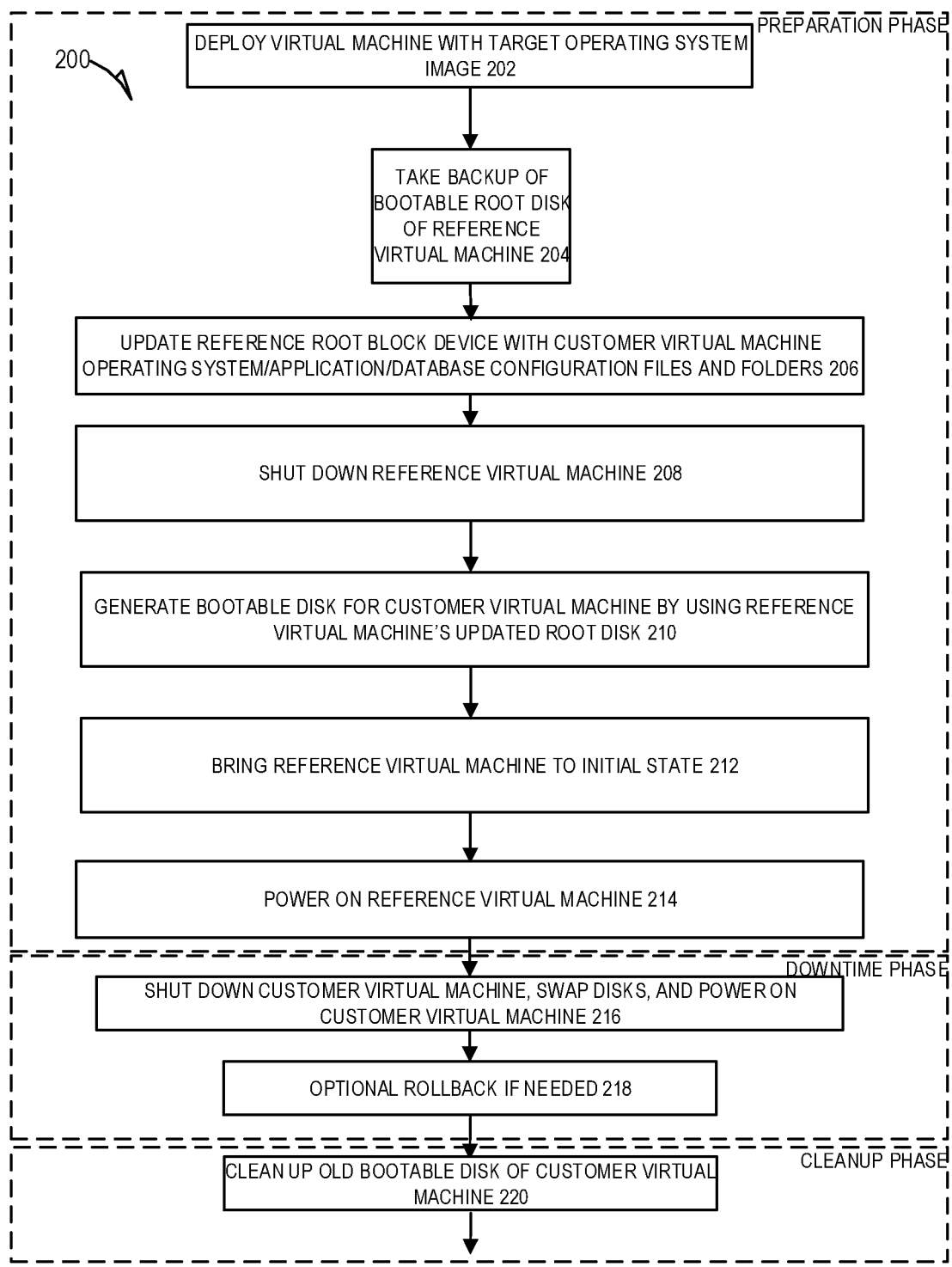
FIG. 2 is a flow diagram illustrating a method of reducing downtime during operating system patching, in accordance with an example embodiment.

FIG. 2 is a flow diagram illustrating a method 200 of reducing downtime during operating system patching, in accordance with an example embodiment. At operation 202, in the preparation phase, a virtual machine is deployed with a target operating system image. The target operating system image is the desired version of the operating system (as opposed to the older version of the operating system being replaced, but which is currently still running). This virtual machine is called a "reference virtual machine."

At operation 204, the preparation phase, a backup of a bootable root disk of the reference virtual machine is taken. Linux servers operating system, for example, are installed under an operating system disk and this disk is called a bootable root disk. The bootable root disk contains the kernel, operating system-related configuration files, folders, packages, etc. During this second step, the reference virtual machine is shut down and a backup of its bootable root is taken. In a VMware platform, the backup of the bootable root disk VMDK file may be taken. For other platforms, such as Amazon Web Services (AWS), Azure, and Google Cloud Platform (GCP) operating systems, a bootable root disk snapshot is taken and the snapshot is restored as a bootable disk.

At operation 206, the preparation phase, a reference root block device (non-volatile mass storage device whose information can be accessed in any order) is updated with customer virtual machine operating system/application/database configuration files and folders. A custom package is installed in the reference virtual machine with this information. More particularly, operating system/application/database configuration files and folders which reside under a root block device are copied from a customer virtual machine to the reference virtual machine. For example, there may be a configuration file name "/etc/hostname." During the copy operation, the "etc/hostname" file in the customer virtual machine is copied to the reference virtual machine and the reference virtual machines "/etc/hostname" file gets updated with the customer virtual machine configuration details. The files and folders are copied into the same path in the reference virtual machine as they were in the customer virtual machine.

This step may be performed by a custom script that identifies operating system/application/database configuration files, folder, and custom packages that reside under the root disk. The script gets executed from the customer virtual machine with an input parameter, such as the reference virtual machine hostname. The script copies the files and folders to the reference virtual machine and installs the custom package in the reference virtual machine.

Table 1 below depicts examples of customer-specific configuration files and folders that may be copied in the third step, in accordance with an example embodiment.

TABLE 1

| Configuration Files/Folders getting copied to the reference VM | |
|---|---|
| /etc/HOSTNAME | /opt/msawb/ |
| /etc/hostname | /etc/group |
| /etc/hosts | /usr/lib/systemd/system/AzureWLBackupCoordinatorSvc.service |
| /etc/fstab | /usr/lib/systemd/system/msawb-rootpluginhost.service |
| /etc/resolv.conf | /usr/lib/systemd/system/msawb-pluginhost-saphana-*.service |
| /etc/profile.local | /etc/postfix/main.cf |
| /etc/bash.bashrc.local | /etc/sasldb2 |
| /etc/csh.cshrc.local | /opt/imal/etc/joschyd.conf |
| /etc/ssh/sshd_config | /opt/imal/etc/hostconfig.xml |
| /etc/rsyslog.d/sftp.conf | /etc/aliases |
| /etc/sysctl.conf | /etc/aliases.db |
| /etc/sysctl.d/ | /etc/sysconfig/postfix |
| /etc/samba | /etc/ssh/ssh_host_* |
| /etc/nsswitch.conf | /var/lib/hdb/ |
| /etc/krb5.conf | /var/lib/sdb/ |
| /etc/krb5.keytab | /var/db2/ |
| /root/.bashrc | /etc/opt/sdb |
| /etc/sysconfig/network/ifcfg-eth1 | /oracle/ |
| /etc/sysconfig/network/ifcfg-eth0 | /var/log/hana* |
| /etc/sysconfig/network/ifcfg-eth2 | /opt/sap/scc/ |
| /etc/sysconfig/network/ifroute-* | /usr/java/ |
| /etc/sysconfig/network/virtualip | /opt/sapjvm_6 |
| /etc/sysconfig/network/routes | /usr/local/sbin/rsccc_daemon |
| /etc/pdnsd.conf | /etc/init.d/scc_daemon |
| /etc/sysconfig/pdnsd | /etc/systemd/system/scc_daemon.service |
| /etc/security/access.conf | /opt/sapjvm |
| /opt/imal/bin/clearlogs_*.sh | /opt/sapjvm_8 |
| /etc/systemd/system/sap-clearlogs-audit.service | /usr/sap/ |
| /etc/logrotate.d/syslog | /sapmnt/ |
| /etc/udev/rules.d/70-persistent-net.rules | /opt/krb5 |
| /root/.ssh/known_hosts | /etc/pam.d/sapstartsrv |
| /etc/chef/ | /etc/init.d/sapinit |
| /home | /etc/opentext/ |
| /etc/services | /home/otarch/ |
| /var/spool/cron/ | /var/adm/opentext |
| /etc/crontab | /var/adm/OpenText/ |
| /etc/cron.d/ | /var/adm/Opentext/ |
| /opt/splunkforwarder/etc/system/local/inputs.conf | /etc/init.d/spawner |
| /opt/splunkforwarder/etc/system/local/server.conf | /etc/init.d/OpenText-tomcat |
| /root/.aws/ | /views_raw/ |
| /var/lib/wicked/duid.xml | /etc/exports |
| /var/lib/wicked/iaid.xml | /srv/www/htdocs/ |
| /var/lib/wicked/lease-eth0-dhcp-ipv4.xml | /opt/appdynamics/ |

At operation 208, the preparation phase, the reference virtual machine is shut down.

At operation 210, the preparation phase, a bootable disk for the customer virtual machine is generated by using the reference virtual machine's updated root disk. Previously, the configuration files and folder were copied and the custom package installed to the reference virtual machine. This means that the reference virtual machine root disk got updated with the customer virtual machine configuration files and folders and had the custom packages installed. For a VMware platform, the bootable VMDK file of the reference virtual machine is copied to the folder where the customer virtual machine operating system VMDK files are residing, by using a corresponding API. For AWS, Azure, and GCP platform, the reference virtual machine bootable root disk snapshot is taken and restored as a bootable disk (prepared disk).

At operation 212, in the preparation phase, the reference virtual machine is brought to an initial state. Specifically, the root disk of the reference virtual machine is updated with customer virtual machine-specific configuration files, folders, and packages (if the customer has multiple virtual machines). To bring the reference virtual machine to the initial state, the initial backup of the reference virtual machine bootable root disk taken in the second step may be used. For a VMware platform, the existing reference virtual machine bootable root disk VMDK file may be deleted and the copied VMDK file may be renamed as the deleted root VMDK filename. For AWS, Azure, and GCP platform, the existing reference virtual machine bootable root disk is detached and the initial root disk generated during the second step is attached.

At operation 214, in the preparation phase, the reference virtual machine is powered on.

At this stage, the preparation phase is complete. This means that bootable disks with the target operating system for the customer virtual machines are available. If the customer has multiple virtual machines, then the second through seventh steps can be repeated for those virtual machines.

At operation 216, in the downtime phase, the customer virtual machine is shut down, the disks are swapped, and the customer virtual machine is powered on. For a VMware platform, the customer virtual machine is shut down, the existing root disk VMDK file is renamed with an "_old" extension with a timestamp, and the copied reference virtual machine root disk VMDK file is renamed to the name of the customer virtual machine original root disk VMDK file, and then the customer virtual machine is powered on. For AWS, Azure, and GCP, the customer virtual machine is shut down, the existing bootable root disk is detached, and the prepared root disk that got restored from the snapshot is attached, and then the customer virtual machine is powered on.

At operation 218, in the downtime phase, optionally, a rollback may be performed in case there are any issues. Since an old bootable disk is available, there is an option to roll back the customer virtual machine in case of any issues with the new operating system version.

At operation 220, in the cleanup phase, the old bootable disk of the customer virtual machine is cleaned up. Once everything has been tested and is operating normally, the old bootable disk of the customer virtual machine may be deleted.

Figure 3:
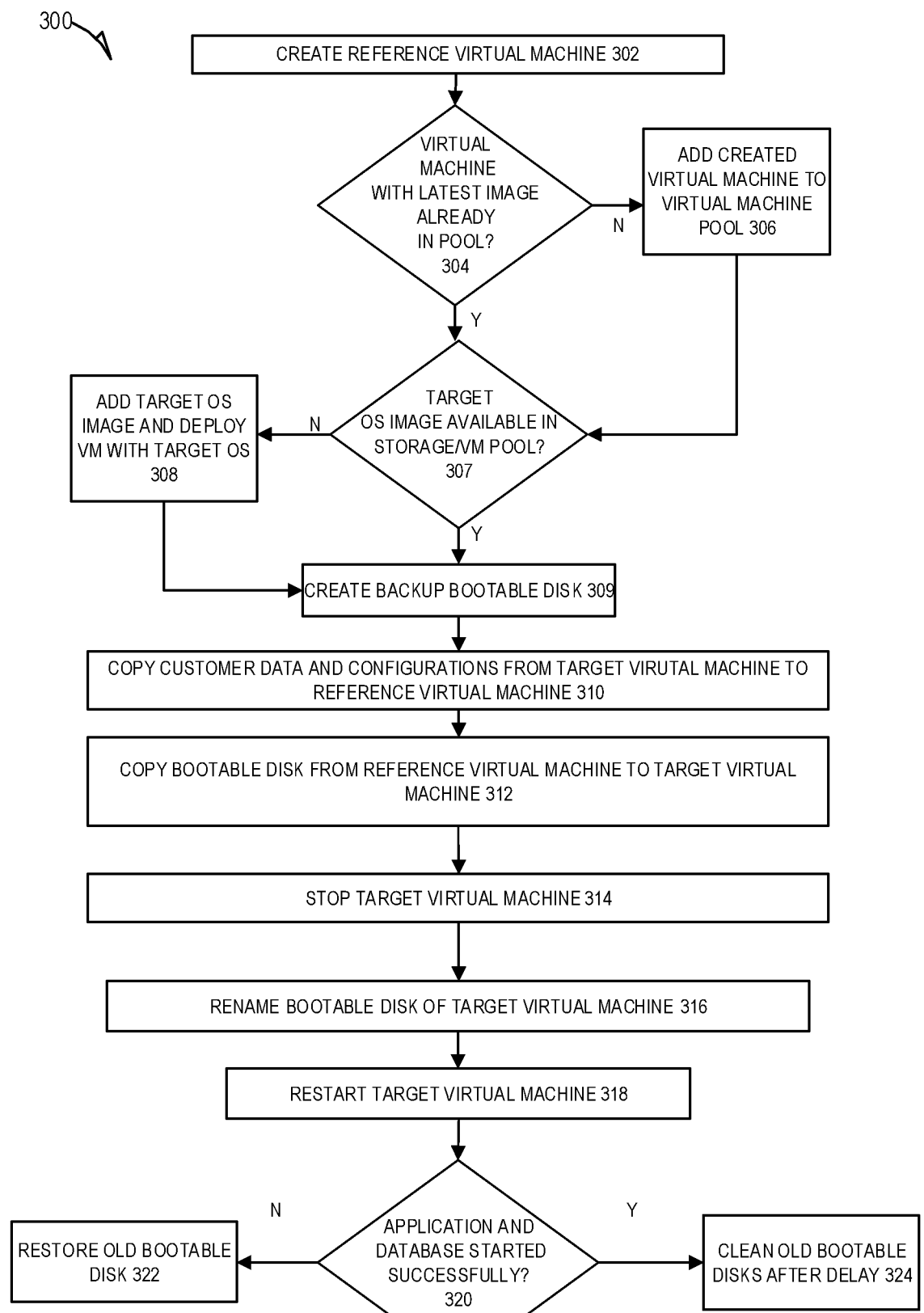
FIG. 3 is a flow diagram illustrating a method of patching an operating system version in accordance with an example embodiment.

FIG. 3 is a flow diagram illustrating a method 300 of patching an operating system version in accordance with an example embodiment. At operation 302, a reference virtual machine is created with the latest image of the operating system version. At operation 304, it is determined if a virtual machine with the latest image is already available in a virtual machine pool. If not, then at operation 306, the created reference virtual machine is added to the virtual machine pool. At operation 307, it is determined if the target OS image is available in the storage/VM pool. If not, then at operation 308, the target OS image is added and virtual machine is deployed with the target OS image At operation 309, a backup bootable disk is created. At operation 310, customer data and configurations are copied from a target virtual machine to the reference virtual machine. At operation 312, the bootable disk from the reference virtual machine is copied to the target virtual machine.

In a downtime phase, at operation 314, the application, database, and virtual machine corresponding to the target virtual machine is stopped. At operation 316, the bootable disk of the target virtual machine is renamed. This may include both renaming the existing bootable disk with a name indicating that it is old (e.g., appending "_old" to it), as well as renaming the bootable disk for the reference virtual machine to the original name of the existing bootable disk for the target virtual machine.

At operation 318, the target virtual machine and the application/database are restarted.

In a cleanup phase, at operation 320, it is determined if the application and database started successfully. If not, then at operation 322, the old bootable disk may be restored using the file name, indicating that it is old. This may include stopping the target virtual machine again, renaming the bootable disk, changing its current name to something indicating that it was a new, but not in use, bootable disk (such as by appending "new_dated" to it and renaming the version of the bootable disk with the name indicating that it is old (e.g., the one ending with "_old") to the current name, and then restarting the target virtual machine.

If it was determined that the application and database started successfully, at operation 324, after a preset delay period (E.g., 48 hours), the old bootable disks (e.g., one the ones ending in "_old") may be cleaned (e.g., deleted)

It should be noted that throughout this document, specific platforms, such as AWS, Azure, and GCP, are discussed. Generally, these operating system types may be collectively known as platform with Hyperscaler architectures.

Figure 4:
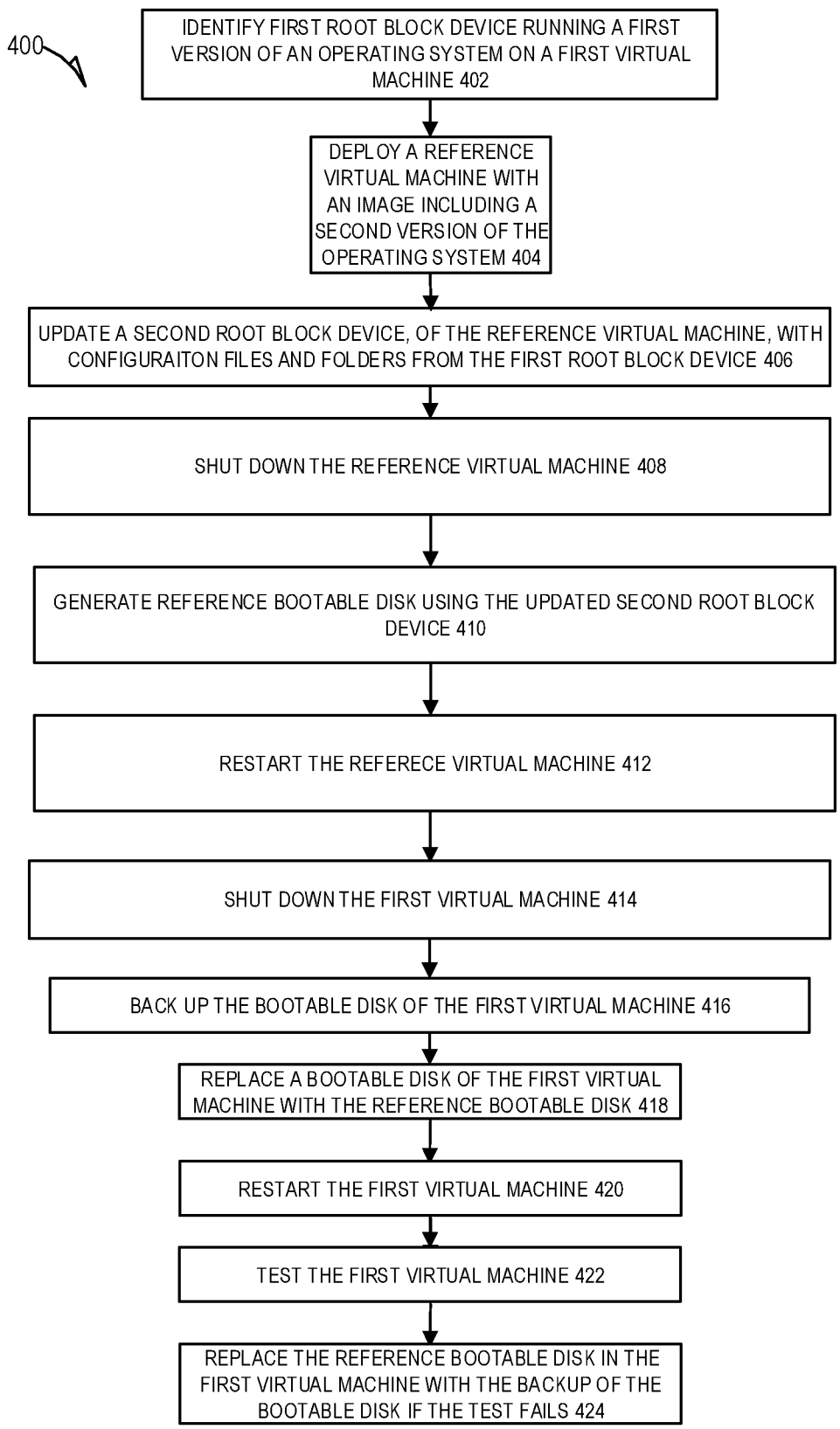
FIG. 4 is a flow diagram illustrating a method of patching an operating system version in accordance with an example embodiment.

FIG. 4 is a flow diagram illustrating a method 400 of patching an operating system version in accordance with another example embodiment. This figure is similar to FIG. 3, but focuses in on the operations as they are performed by a single component of a system. At operation 402, a first root block device running a first version of an operating system on a first virtual device is identified. At operation 404, a reference virtual machine with an image including a second version of the operating system is deployed.

At operation 406, a second root block device of the reference virtual machine is updated with configuration files and folders from the first root block device. At operation 408, the reference virtual machine is shut down. At operation 410, a reference bootable disk is generated using the updated second root block device. At operation 412, the reference virtual machine is restarted.

At operation 414, the first virtual machine is shut down. At operation 416, the bootable disk of the first virtual machine is backed up. At operation 418, a bootable disk of the first virtual machine is replaced with a reference bootable disk. At operation 420 the first virtual machine is restarted.

At operation 422, the first virtual machine is tested. At operation 424, if the test fails, then the reference bootable disk in the first virtual machine is replaced with the backup of the bootable disk.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a computer-readable medium storing instructions that, when executed by the at least one hardware processor, cause the at least one hardware processor to perform operations comprising:
identifying a first root block device running a first version of an operating system on a first virtual machine;
deploying a reference virtual machine with an image including a second version of the operating system;
updating a second root block device, of the reference virtual machine, with configuration files and folders from the first root block device;
generating a reference bootable disk using the updated second root block device;
shutting down the first virtual machine;
replacing a bootable disk of the first virtual machine with the reference bootable disk; and
restarting the first virtual machine.

Example 2. The system of Example 1, wherein the identifying, deploying, updating, and generating and performed while the first virtual machine is running.

Example 3. The system of Examples 1 or 2, wherein the operations further comprise:
shutting down the reference virtual machine prior to the generating and restarting the reference virtual machine after the generating.

Example 4. The system of any of Examples 1-3, wherein the operations further comprise:
backing up the bootable disk of the first virtual machine prior to the replacing;
testing the first virtual machine after it has been restarted; and
in response to a determination that the first virtual machine has failed the backup of the bootable disk.

Example 5. The system of Example 4, wherein the testing includes running applications and databases in the first virtual machine to determine whether they operate properly.

Example 6. The system of any of Examples 1-5, wherein the operating system is a hyperscaler type operating system and the replacing includes detaching the bootable disk of the first virtual machine and attaching the reference bootable disk to the first virtual machine.

Example 7. The system of Example 4, wherein the operating system is a hyperscaler type operating system and the backing up includes taking a snapshot of the bootable disk of the first virtual machine and restoring the snapshot as a bootable disk.

Example 8. A method comprising:
identifying a first root block device running a first version of an operating system on a first virtual machine;
deploying a reference virtual machine with an image including a second version of the operating system;
updating a second root block device, of the reference virtual machine, with configuration files and folders from the first root block device;
generating a reference bootable disk using the updated second root block device;
shutting down the first virtual machine;
replacing a bootable disk of the first virtual machine with the reference bootable disk; and
restarting the first virtual machine.

Example 9. The method of Example 8, wherein the identifying, deploying, updating, and generating and performed while the first virtual machine is running.

Example 10. The method of Examples 8 or 9, further comprising:
shutting down the reference virtual machine prior to the generating and restarting the reference virtual machine after the generating.

Example 11. The method of any of Examples 8-10, further comprising:
backing up the bootable disk of the first virtual machine prior to the replacing;
testing the first virtual machine after it has been restarted; and
in response to a determination that the first virtual machine has failed the testing, replacing the reference bootable disk in the first virtual machine with the backup of the bootable disk.

Example 12. The method of Example 11, wherein the testing includes running applications and databases in the first virtual machine to determine whether they operate properly.

Example 13. The method of any of Examples 8-12, wherein the operating system is a hyperscaler type operating system and the replacing includes detaching the bootable disk of the first virtual machine and attaching the reference bootable disk to the first virtual machine.

Example 14. The method of Example 11, wherein the operating system is a hyperscaler type operating system and the backing up includes taking a snapshot of the bootable disk of the first virtual machine and restoring the snapshot as a bootable disk.

Example 15. A non-transitory machine-readable medium storing instructions which, when executed by one or more processors, cause the one or more processors to perform operations comprising:
identifying a first root block device running a first version of an operating system on a first virtual machine;
deploying a reference virtual machine with an image including a second version of the operating system;
updating a second root block device, of the reference virtual machine, with configuration files and folders from the first root block device;
generating a reference bootable disk using the updated second root block device;
shutting down the first virtual machine;
replacing a bootable disk of the first virtual machine with the reference bootable disk; and
restarting the first virtual machine.

Example 16. The non-transitory machine-readable medium of Example 15, wherein the identifying, deploying, updating, and generating are performed while the first virtual machine is running.

Example 17. The non-transitory machine-readable medium of any of Examples claim 15-16, wherein the operations further comprise:
shutting down the reference virtual machine prior to the generating and restarting the reference virtual machine after the generating.

Example 18. The non-transitory machine-readable medium of any of Examples 15-17, wherein the operations further comprise:
backing up the bootable disk of the first virtual machine prior to the replacing;

testing the first virtual machine after it has been restarted; and in response to a determination that the first virtual machine has failed the backup of the bootable disk.

Example 19. The non-transitory machine-readable medium of Example 18, wherein the testing includes running applications and databases in the first virtual machine to determine whether they operate properly.

Example 20. The non-transitory machine-readable medium of any of Examples 15-19, wherein the operating system is a hyperscaler type operating system and the replacing includes detaching the bootable disk of the first virtual machine and attaching the reference bootable disk to the first virtual machine.

Figure 5:
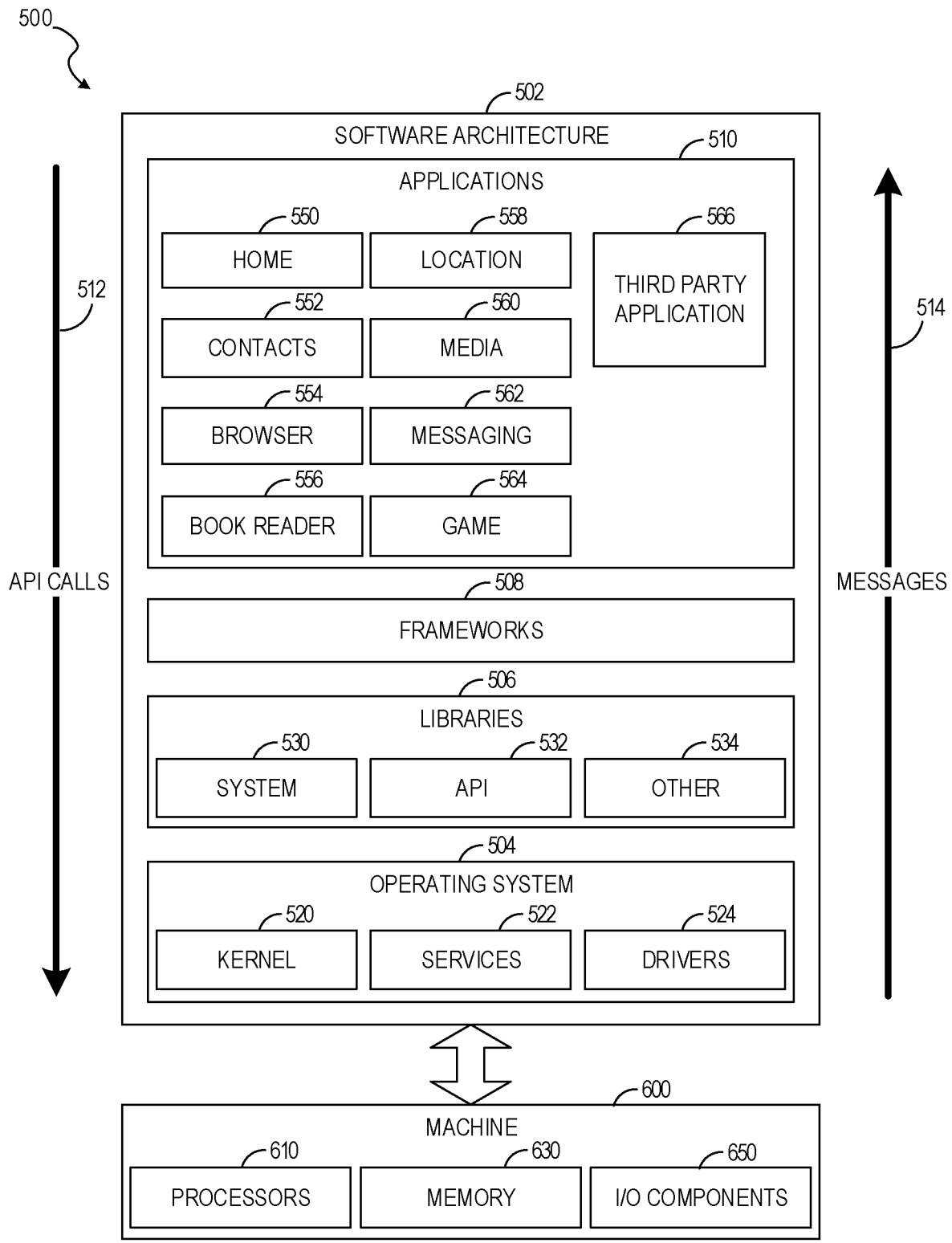
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke Application Program Interface (API) calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510. For example, the frameworks 508 provide various graphical user interface functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. The applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 566 can invoke the API calls 512 provided by the operating system 504 to facilitate functionality described herein.

Figure 6:
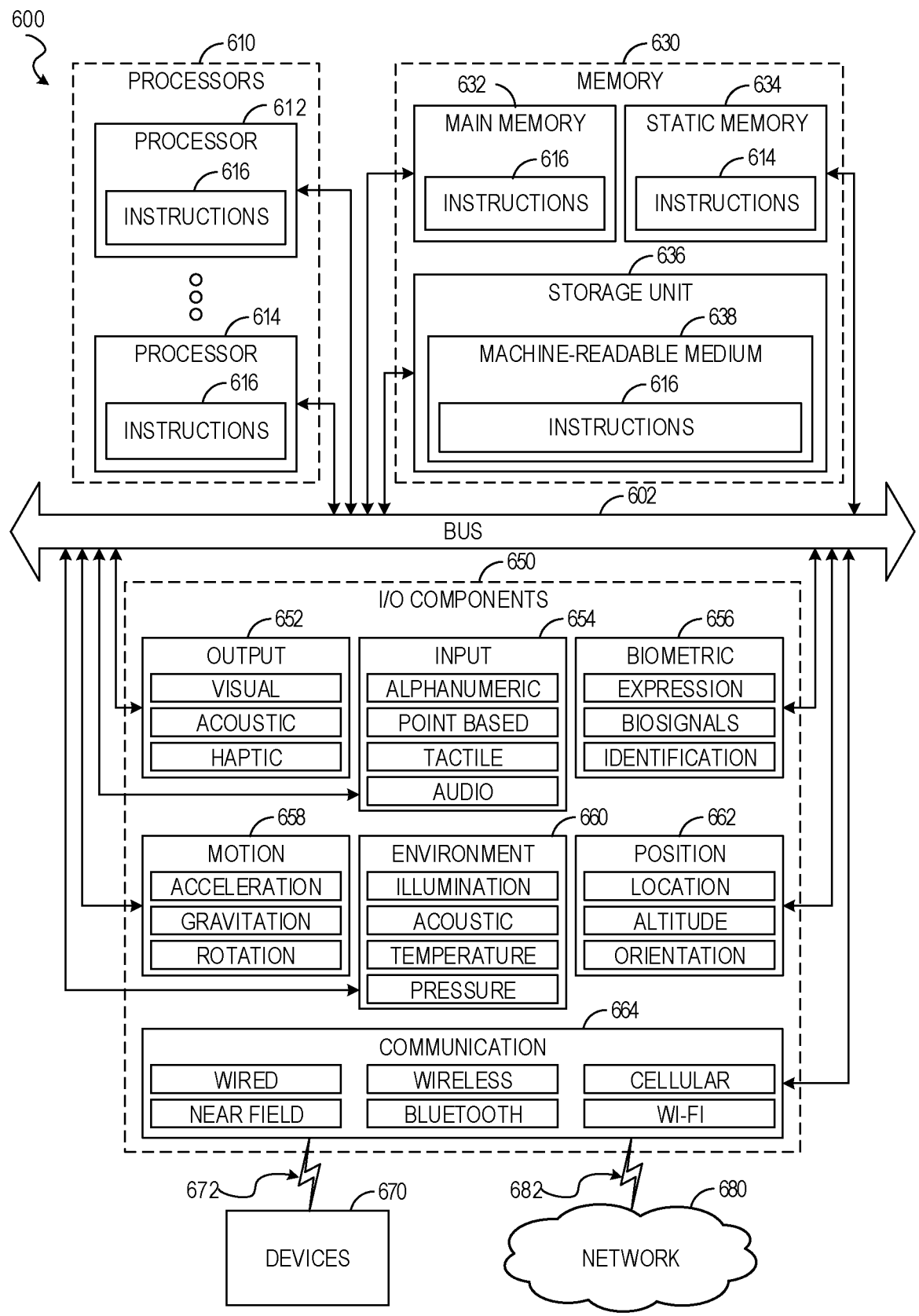
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) cause the machine 600 to perform any one or more of the methodologies discussed herein to be executed. For example, the instructions 616 may cause the machine 600 to execute the method of FIG. 2. Additionally, or alternatively, the instructions 616 may implement FIGS. 1-2 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar codes, multi-dimensional bar codes such as QR code, Aztec codes, Data Matrix, Dataglyph, Maxi Code, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 5G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 580 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
    at least one hardware processor; and
    a non-transitory computer-readable medium storing instructions that, when executed by the at least one hardware processor, cause the at least one hardware processor to perform operations comprising:
    identifying a first root block device running a first version of an operating system on a first virtual machine;
    deploying a reference virtual machine running a second version of the operating system, while the first virtual machine running the first version of the operating system is operating, the second version being different than the first version;
    updating a second root block device, of the reference virtual machine, with configuration files and folders from the first root block device;
    generating a reference bootable disk using the updated second root block device;
    after generating the reference bootable disk, shutting down the first virtual machine;
    identifying a location of the reference bootable disk;
    replacing a bootable disk of the first virtual machine with the reference bootable disk by renaming the first virtual machine with a name of the reference bootable disk; and
    restarting the first virtual machine.

2. The system of claim 1, wherein the identifying, deploying, updating, and generating and performed while the first virtual machine is running.

3. The system of claim 1, wherein the operations further comprise:
    shutting down the reference virtual machine prior to the generating and restarting the reference virtual machine after the generating.

4. The system of claim 1, wherein the operations further comprise:
    creating a backup of the bootable disk of the first virtual machine prior to the replacing;

testing the first virtual machine after it has been restarted; and in response to a determination that the first virtual machine has failed the testing, replacing the reference bootable disk in the first virtual machine with the backup of the bootable disk.

5. The system of claim 4, wherein the testing includes running applications and databases in the first virtual machine to determine whether they operate properly.

6. The system of claim 4, wherein the operating system is a hyperscaler type operating system and the creating of the backup includes taking a snapshot of the bootable disk of the first virtual machine and restoring the snapshot as a bootable disk.

7. The system of claim 1, wherein the operating system is a hyperscaler type operating system and the replacing includes detaching the bootable disk of the first virtual machine and attaching the reference bootable disk to the first virtual machine.

8. A method comprising:
identifying a first root block device running a first version of an operating system on a first virtual machine;
deploying a reference virtual machine running a second version of the operating system, while the first virtual machine running the first version of the operating system is operating, the second version being different than the first version;
updating a second root block device, of the reference virtual machine, with configuration files and folders from the first root block device;
generating a reference bootable disk using the updated second root block device;
after generating the reference bootable disk, shutting down the first virtual machine;
identifying a location of the reference bootable disk;
replacing a bootable disk of the first virtual machine with the reference bootable disk by renaming the first virtual machine with a name of the reference bootable disk; and
restarting the first virtual machine.

9. The method of claim 8, wherein the identifying, deploying, updating, and generating are performed while the first virtual machine is running.

10. The method of claim 8, further comprising:
shutting down the reference virtual machine prior to the generating and restarting the reference virtual machine after the generating.

11. The method of claim 8, further comprising:
creating a backup of the bootable disk of the first virtual machine prior to the replacing;
testing the first virtual machine after it has been restarted; and
in response to a determination that the first virtual machine has failed the testing, replacing the reference bootable disk in the first virtual machine with the backup of the bootable disk.

12. The method of claim 11, wherein the testing includes running applications and databases in the first virtual machine to determine whether they operate properly.

13. The method of claim 11, wherein the operating system is a hyperscaler type operating system and the creating of the backup includes taking a snapshot of the bootable disk of the first virtual machine and restoring the snapshot as a bootable disk.

14. The method of claim 8, wherein the operating system is a hyperscaler type operating system and the replacing includes detaching the bootable disk of the first virtual machine and attaching the reference bootable disk to the first virtual machine.

15. A non-transitory machine-readable medium storing instructions which, when executed by one or more processors, cause the one or more processors to perform operations comprising:
identifying a first root block device running a first version of an operating system on a first virtual machine;
deploying a reference virtual machine running a second version of the operating system, while the first virtual machine running the first version of the operating system is operating, the second version being different than the first version;
updating a second root block device, of the reference virtual machine, with configuration files and folders from the first root block device;
generating a reference bootable disk using the updated second root block device;
after generating the reference bootable disk, shutting down the first virtual machine;
identifying a location of the reference bootable disk;
replacing a bootable disk of the first virtual machine with the reference bootable disk by renaming the first virtual machine with a name of the reference bootable disk; and
restarting the first virtual machine.

16. The non-transitory machine-readable medium of claim 15, wherein the identifying, deploying, updating, and generating are performed while the first virtual machine is running.

17. The non-transitory machine-readable medium of claim 15, wherein the operations further comprise:
shutting down the reference virtual machine prior to the generating and restarting the reference virtual machine after the generating.

18. The non-transitory machine-readable medium of claim 15, wherein the operations further comprise:
creating a backup of the bootable disk of the first virtual machine prior to the replacing;
testing the first virtual machine after it has been restarted; and
in response to a determination that the first virtual machine has failed the testing, replacing the reference bootable disk in the first virtual machine with the backup of the bootable disk.

19. The non-transitory machine-readable medium of claim 18, wherein the testing includes running applications and databases in the first virtual machine to determine whether they operate properly.

20. The non-transitory machine-readable medium of claim 15, wherein the operating system is a hyperscaler type operating system and the replacing includes detaching the bootable disk of the first virtual machine and attaching the reference bootable disk to the first virtual machine.

* * * * *